(12) United States Patent
Harder et al.

(10) Patent No.: US 7,449,880 B2
(45) Date of Patent: Nov. 11, 2008

(54) METHOD FOR DETERMINING THE ANGULAR POSITION OF THE ROTOR IN A ROTATING ELECTRIC MACHINE

(75) Inventors: Thorsten Harder, Koblenz (CH); Dirk Beiser, Enneturgi (CH); Fabio Conticelli, Dättwil (CH); Patrick Bohren, Lenzburg (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 11/898,654

(22) Filed: Sep. 13, 2007

(65) Prior Publication Data

US 2008/0074103 A1   Mar. 27, 2008

(30) Foreign Application Priority Data

Sep. 13, 2006   (EP)   ................... 06405391

(51) Int. Cl.
  *G01B 7/30*   (2006.01)
(52) U.S. Cl. .................. 324/207.25; 324/239
(58) Field of Classification Search ............ 324/207.25, 324/238–239, 257–258, 244; 73/514.31, 73/514.39; 318/254.1; 310/68 B
  See application file for complete search history.

(56) References Cited

U.S. PATENT DOCUMENTS 6,172,498 B1   1/2001   Schmidt et al.
7,026,812 B2 *   4/2006   Honkura et al. ............. 324/244

OTHER PUBLICATIONS

Senyu, T. et al., "Initial rotor position estimation of salient-pole brushless DC motors by artificial neural network." Power Conversion Conference, Nagaoka 1997, Proceedings of the Nagaoka, Japan Aug. 3-6, 1997, New York, NY, USA, IEEE, US, Bd. 1, 3. Aug. 1997, XP010257297, ISBN: 0-7803-3823-5, pp. 145-150.
Holtz, Joachim, "Sensorless Control of Induction Motor Drives." Proceedings of the IEEE, IEEE, New York, NY, US, Bd. 90, Nr. Aug. 8, 2002, XP011065049, ISSN: 0018-9219, pp. 1359-1394.
European Search Report issued on Feb. 1, 2007 in European Patent Application No. 06405391.1.

\* cited by examiner

*Primary Examiner*—Bot LeDynh
(74) *Attorney, Agent, or Firm*—Buchan Ingersoll & Rooney PC

(57) ABSTRACT

A method is suggested for determining the angular position of the rotor in a rotating electric machine, which machine has a stator winding set with at least three stator windings, and the stator winding set is powered by a converter device. Firstly, a first voltage ($U_1$) is applied to the stator winding set via the converter device within a first definable time period ($t_{x1}$), and a first current gradient $$\left(\frac{di}{dt}\bigg|_{U_1}\right)$$

is calculated therefor, and a second voltage ($U_2$) is applied to the stator winding set via the converter device within the first definable time period ($t_{x1}$), and a second current gradient $$\left(\frac{di}{dt}\bigg|_{U_2}\right)$$

is calculated therefor. A third voltage ($U_3$) is then applied to the stator winding set via the converter device within a second definable time period ($t_{x2}$), and a third current gradient $$\left(\frac{di}{dt}\bigg|_{U_3}\right)$$

is calculated therefor, and a fourth voltage ($U_4$) is applied to the stator winding set via the converter device within the second definable time period ($t_{x2}$), and a fourth current gradient $$\left(\frac{di}{dt}\bigg|_{U4}\right)$$

is calculated therefor. A partial rotor position ($\gamma$) is calculated from the first, second, third and fourth current gradients $$\left(\frac{di}{dt}\bigg|_{U_1}, \frac{di}{dt}\bigg|_{U_2}, \frac{di}{dt}\bigg|_3, \frac{di}{dt}\bigg|_{U_4}\right).$$

The stator voltage ($U_S$) at the stator winding set and the stator current ($I_S$) at the stator winding set are also determined continuously and a first stator flux signal ($\psi_1$) is calculated from the stator voltage ($U_S$) and the stator current ($I_S$), and a second stator flux signal ($\psi_2$) is calculated from the stator current ($I_S$) and a magnetisation flux ($\psi_M$) of the stator winding set. Moreover, the cosine angle function of the first stator flux signal ($\psi_1$) and of the second stator flux signal ($\psi_2$) is derived, wherein the difference is derived from the cosine angle function of the first stator flux signal ($\psi_1$) and the cosine angle function of the second stator flux signal ($\psi_2$). If the difference lies outside an adjustable tolerance range, a correction phase angle ($\psi_K$) is added to the partial rotor position angle ($\gamma$).

6 Claims, 1 Drawing Sheet

METHOD FOR DETERMINING THE ANGULAR POSITION OF THE ROTOR IN A ROTATING ELECTRIC MACHINE

This application claims foreign priority under 35 U.S.C. 119 (a-d) of EPO patent application No. 06405391.1, filed Sep. 13, 2006, the content of which is incorporated herein by reference in its entirety.

TECHNICAL AREA

The invention relates to the field of the methods of operating rotating electric machines. It is based on a method for determining the angular position of the rotor or the magnetic flux angle in a rotating electric machine as described in the preamble of the independent claim.

RELATED ART

Rotating electric machines such as are in common use today include a stator winding set with at least three stator windings, and the stator winding set is typically powered by a slaved converter device. In modern rotating electric machines, the angular position of the rotor is determined for the most part by a rotary position transducer, which returns the desired angular rotor position, i.e. the angular position or the magnetic flux angle of the rotor while it is turning. It is essential to know the position the rotor or the position of the magnetic flux vector because this is typically one of several input variables that are used to control the rotating machine. However, rotary position transducers are highly susceptible to mechanical overload, and consequently they fail frequently or return incorrect values for the angular rotor position.

They also have to be installed, because the rotary position transducer itself as well as its cabling must be attached to the machine, which involves considerable effort and costs. A rotary position transducer of such kind must also be maintained constantly, which entails more work and expense.

BRIEF DESCRIPTION OF THE INVENTION

The object of the invention is therefore to suggest a method for determining the angular position of a rotor in a rotating electric machine that is sturdy and easily constructed, and does not require a rotary position transducer. This object is solved by the features of claim 1. Advantageous refinements of the invention are described in the dependent claims.

In the method according to the invention for determining the angular position of a rotor in an electric machine, the machine has a stator winding set with at least three stator windings, the stator winding set being powered by a slaved converter device. According to the invention, a first voltage is then applied to the stator winding set via the converter device within a first definable time period and a first current gradient is calculated therefor, a second voltage is applied to the stator winding set via the converter device within the first definable time period and a second current gradient is calculated for this. The first and second voltages are applied within the first definable time period, particularly consecutively in temporal terms. A third voltage is also applied to the stator winding set via the converter device within a second definable time period, and a third current gradient is calculated therefor, and a fourth voltage is applied to the stator winding set via the converter device within the second definable time period, and a fourth current gradient is calculated therefor. The third and fourth voltages are applied within the second definable time period, particularly consecutively in temporal terms. A partial rotor position angle is then calculated from the first, second, third and fourth current gradients. The stator voltage at the stator winding set and the stator current at the stator winding set are also determined continuously, and a first stator flux signal is calculated from the stator voltage and the stator current, and a second stator flux signal is calculated from the stator current and a magnetisation flux of the stator winding set. The cosine angle function of both the first and the second stator flux signals, and also the difference between these signals is constructed from the cosine angle function of the first stator flux signal and the cosine angle function of the second stator flux signal. If the difference is outside of an adjustable tolerance range, a correction phase angle is added to the partial rotor position angle. On the other hand, if the difference lies with the tolerance range, a correction phase angle is not added and the desired angular position of the rotor is then the partial rotor position angle. In this way, it is advantageously possible to determine the angular position of a rotor in a rotating electric machine according to the method of the invention without the use of a rotary position transducer and the disadvantages associated therewith, with the overall effect of providing a robust and very easily implemented method for determining the angular position of a rotor in a rotating electric machine.

These and other tasks, advantages and features of the present invention will be made clear in the following detailed description of preferred embodiments of the invention in conjunction with the drawing.

BRIEF DESCRIPTION OF THE DRAWING

In the drawing.

In the FIGURE, identical parts are identified by the same reference numbers in all cases.

WAYS TO IMPLEMENT THE INVENTION

In the method according to the invention for determining the angular position of a rotor in a rotating electric machine, the machine has a stator winding set including at least three stator windings, and the stator winding set is powered by a converter device.

First, a first voltage $U_1$ is applied to the stator winding set by the converter device within a first, definable time period $t_{x1}$ and a first current gradient $$\left.\frac{di}{dt}\right|_{U_1}$$

is calculated therefor. First voltage $U_1$ is a voltage vector having a predefined angle $\alpha$. A second voltage $U_2$ is also applied to the stator winding set via the converter device within first definable time period $t_{x1}$, and a second current gradient $$\left(\frac{di}{dt}\bigg|_{U2}\right)$$

is calculated for this voltage. Second voltage $U_2$ is a voltage vector having a predefined angle $-\alpha$. First and second voltages $U_1$, $U_2$ are applied within the first definable time period, particularly one after the other. A third voltage $U_3$ is also applied to the stator winding set via the converter device within a second definable time period $t_{x2}$ and a third current gradient $$\frac{di}{dt}\bigg|_{U3}$$

is calculated therefor. Third voltage $U_3$ is a voltage vector having a predefined angle $\beta$. A fourth voltage $U_4$ is also applied to the stator winding set via the converter device within second definable time period $t_{x2}$ and a fourth current gradient $$\frac{di}{dt}\bigg|_{U4}$$

is calculated therefor. Fourth voltage $U_4$ is a voltage vector having a predefined angle $-\beta$. Each of current gradients $$\frac{di}{dt}\bigg|_{U_1}, \frac{di}{dt}\bigg|_{U_2}, \frac{di}{dt}\bigg|_{U_3}, \frac{di}{dt}\bigg|_{U_4}$$

is preferably calculated by appropriate measurement. First definable time period $t_{x1}$ is preferably of the same duration as second definable time period $t_{x2}$. First definable time period $t_{x1}$ and definable time period $t_{x2}$ are also advantageously selected on the basis of the machine inductances, such as for example stray stator inductance $L_{S\sigma}$.

A partial rotor position angle $\gamma$ is then calculated from the first, second, third and fourth current gradients $$\frac{di}{dt}\bigg|_{U_1}, \frac{di}{dt}\bigg|_{U_2}, \frac{di}{dt}\bigg|_{U_3}, \frac{di}{dt}\bigg|_{U_4}.$$

Partial rotor position angle $\gamma$ is preferably calculated using the following formula $$\gamma = \arctan\left(\frac{\text{Re}\left(e^{-j\alpha}\cdot\left(\frac{di}{dt}\bigg|_{U_1} - \frac{di}{dt}\bigg|_{U_2}\right)\right) - \text{Re}\left(e^{-j\beta}\cdot\left(\frac{di}{dt}\bigg|_{U_3} - \frac{di}{dt}\bigg|_{U_4}\right)\right)}{\text{Im}\left(e^{-j\alpha}\cdot\left(\frac{di}{dt}\bigg|_{U_1} - \frac{di}{dt}\bigg|_{U_2}\right)\right) - \text{Im}\left(e^{-j\beta}\cdot\left(\frac{di}{dt}\bigg|_{U_3} - \frac{di}{dt}\bigg|_{U_4}\right)\right)}\right)\cdot(-0.5)$$

Figure 1:
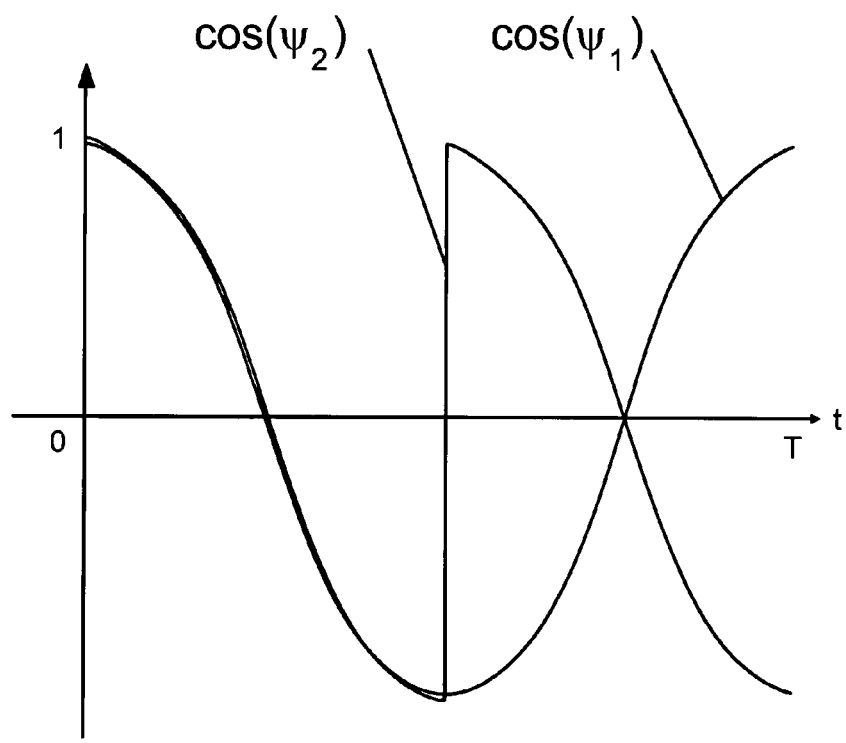
FIG. 1 shows the temporal curves of the cosine angle function of a first and a second stator flux signal of the rotating electric machine, and a temporal curve of a partial rotor position angle in the method according to the invention.
Figure 1:
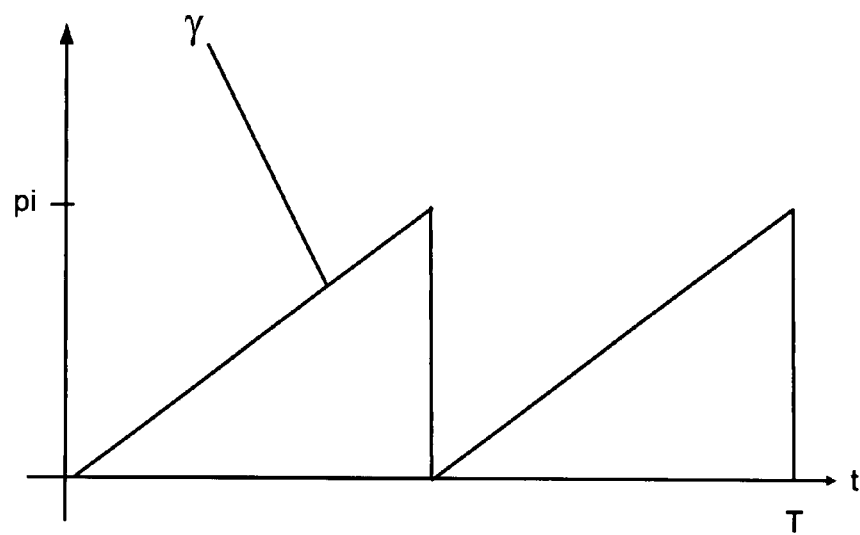

A temporal curve of the partial rotor position angle $\gamma$ therefor is shown in FIG. 1. The other temporal curves in FIG. 1 will be explained in greater detail in the following. According to the curve of partial rotor position angle $\gamma$ as shown in FIG. 1, partial rotor position angle $\gamma$ only indicates an angular position between 0 and $\pi$, that is to say only in the first and second quadrants of a four-quadrant representation. At the same time, all angular positions between 0 and $2\pi$, that is to say all four quadrants in the four-quadrant representation, are possible. In order to ensure that it is possible to determine all angular positions, stator voltage $U_S$ at the stator winding set and stator current $I_S$ at the stator winding set are first determined continuously, and a first stator flux signal $\psi_1$ is calculated from stator voltage $U_S$ and stator current $I_S$, and a second stator flux signal $\psi_2$ is calculated from stator current $I_S$ and a magnetisation flux $\psi_M$ of the stator winding set. First stator flux signal $\psi_1$ is calculated using the following formula $$\underline{\psi_1} = \int(\underline{U_S} - R_S\cdot\underline{I_S})dt = \psi_{1x} + j\psi_{1y},$$

wherein $R_S$ is the ohmic stator winding resistance, which is typically known from the machine data, and first stator flux signal $\psi_1$ is a complex variable $\underline{\psi_1}$ consisting of its associated x-coordinate $\psi_{1x}$ and its associated y-coordinate $\psi_{1y}$, in an xy-stator reference system. Particularly the first stator flux signal $\psi_1$ is also calculated from stator resistance $R_S$ using the formula shown earlier.

The following deals in detail with the calculation of second stator flux signal $\psi_2$. Since second stator flux signal $\psi_2$ is calculated on the basis of parks in the rotor reference system, first the measured stator current $I_S$ must be transferred to the rotor reference system:

$$I_{sd} = I_{sx}\cdot\cos(\gamma) + I_{sy}\cdot\sin(\gamma)$$

$$I_{sq} = I_{sy}\cdot\cos(\gamma) - I_{sx}\cdot\sin(\gamma)$$

Second stator flux signal $\psi_2$ may be written as a park transformation in the following way:

$$\psi_{2d} = \psi_{md} + i_{sd}\cdot L_{s\sigma}$$

$$\psi_{2q} = \psi_{mq} + i_{sq}\cdot L_{s\sigma}$$

Second stator flux signal $\psi_2$ in the xy-stator reference system may then be written as follows:

$$\psi_{2x} = \psi_{2d}\cdot\cos(\gamma) + \psi_{2q}\cdot\sin(\gamma)$$

$$\psi_{2y} = \psi_{2q}\cdot\cos(\gamma) + \psi_{2d}\cdot\sin(\gamma)$$

wherein $$\underline{\psi_2} = \psi_{2x} + j\psi_{2y}$$

and $\psi_{md}$ is the d component of the park transformation of the stator magnetisation flux of the stator winding set, which is provided in advance as a known or supplied variable, $\psi_{mq}$ is the q component of the park transformation of the stator magnetisation flux, $I_{Sd}$ is the d component of the park transformation of stator current $I_S$, $I_{Sq}$ is the q component of the park transformation of stator current $I_S$, and $L_{S\sigma}$ is the stray stator inductance, which is known from the machine data. The second stator flux signal $\psi_2$ is also represented in the formula shown earlier as complex variable $\underline{\psi_2}$ with its associated x coordinate $\psi_{2x}$ and its associated y coordinate $\psi_{2y}$, in the xy stator reference system. It should be noted that the Park transformation described previously is sufficiently known to one skilled in the art. In particular, the second stator flux signal $\psi_2$ is also calculated from the stray stator inductance $L_{S\sigma}$ using the formula shown previously.

According to the invention, the cosine angle function of the first stator flux signal $\psi_1$ and the second stator flux signal $\psi_2$ is formed, at which point reference is made to FIG. 1, in which the temporal curve of the cosine angle function of the first and second stator flux signals $\psi_1$, $\psi_2$ of the rotating electric machine is shown as well as the temporal curve of the partial rotor position angle γ described previously. Since according to the formula shown previously second stator flux signal $\psi_2$ is dependent on partial rotor position angle γ and, as was explained earlier, partial rotor position angle γ indicates an angular position between 0 and π, a corresponding temporal curve of the cosine angle function of second stator flux signal $\psi_2$ is yielded. According to the invention, the difference is constructed from the cosine angle function of first stator flux signal $\psi_1$ and the cosine angle function of second stator flux signal $\psi_2$, and a correction phase angle $\psi_K$ is added to partial rotor position angle γ.

If the difference between the cosine angle functions of the two stator flux signals $\psi_1$ and $\psi_2$ is within the tolerance range, it is assumed that partial rotor position angle γ matches the desired angular position of the rotor. However, if the constructed difference between the cosine angle functions of the two stator flux signals $\psi_1$ and $\psi_2$ lies outside the adjustable tolerance range, it is assumed that partial rotor position angle γ has jumped from 0 to π or from π to 0, and correction phase angle $\psi_K$ is added accordingly. Correction phase angle $\psi_K$ is preferably π. The result of this addition is then the desired angular position of the rotor. The angular position of the rotor may thus be determined advantageously without a rotary position transducer and the drawbacks associated therewith, with the overall effect of providing a robust and very easily implemented method for determining the angular position of a rotor in a rotating electric machine.

The invention claimed is:

1. Method for determining the angular position of a rotor in a rotating electric machine, which machine has a stator winding set with at least three stator windings,
   in which the stator winding set is powered by a converter device,
   wherein
   a first voltage ($U_1$) is applied to the stator winding set via the converter device within a first definable time period ($t_{x1}$), and a first current gradient $$\left(\frac{di}{dt}\bigg|_{U_1}\right)$$

is calculated therefor, and a second voltage ($U_2$) is applied to the stator winding set via the converter device within the first definable time period ($t_{x1}$), and a second current gradient $$\left(\frac{di}{dt}\bigg|_{U_2}\right)$$

is calculated therefor, a third voltage ($U_3$) is applied to the stator winding set via the converter device within a second definable time period ($t_{x2}$), and a third current gradient $$\left(\frac{di}{dt}\bigg|_{U_3}\right)$$

is calculated therefor, and a fourth voltage ($U_4$) is applied to the stator winding set via the converter device within the second definable time period ($t_{x2}$), and a fourth current gradient $$\left(\frac{di}{dt}\bigg|_{U_4}\right)$$

is calculated therefor, a partial rotor position (γ) is calculated from the first, second, third and fourth current gradients $$\left(\frac{di}{dt}\bigg|_{U_1}, \frac{di}{dt}\bigg|_{U_2}, \frac{di}{dt}\bigg|_{3}, \frac{di}{dt}\bigg|_{U_4}\right),$$

the stator voltage ($U_S$) at the stator winding set and the stator current ($I_S$) at the stator winding set are determined continuously, and a first stator flux signal ($\psi_1$) is calculated from the stator voltage ($U_S$) and the stator current ($I_S$), and a second stator flux signal ($\psi_2$) is calculated from the stator current ($I_S$) and a magnetisation flux ($\psi_M$) of the stator winding set,
   the cosine angle function of the first stator flux signal ($\psi_1$) and of the second stator flux signal ($\psi_2$) is derived,
   the difference is derived from the cosine angle function of the first stator flux signal ($\psi_1$) and the cosine angle function of the second stator flux signal ($\psi_2$), and
   a correction phase angle ($\psi_K$) is added to the partial rotor position angle (γ) if the difference lies outside an adjustable tolerance range.

2. The method as recited in claim 1, wherein the correction phase angle ($\psi_K$) is π.

3. The method as recited in claim 1, wherein the first definable time period ($t_{x1}$) is of the same duration as the second definable time period ($t_{x2}$).

4. The method as recited in claim 1, wherein the first definable time period ($t_{x1}$) and the second definable time period ($t_{x2}$) is selected depending on the machine inductances.

5. The method as recited in claim 1, wherein the first stator flux signal ($\psi_1$) is also calculated from a stator resistance ($R_S$).

6. The method as recited in claim 1, wherein the second stator flux signal ($\psi_2$) is also calculated from a stray stator inductance ($L_{S\sigma}$).

\* \* \* \* \*